United States Patent
An et al.

(10) Patent No.: US 12,340,564 B2
(45) Date of Patent: Jun. 24, 2025

(54) MODEL GENERATION METHOD AND APPARATUS, OBJECT DETECTION METHOD AND APPARATUS, DEVICE, AND STORAGE MEDIUM

(71) Applicant: Beijing Jingdong Qianshi Technology Co., Ltd., Beijing (CN)

(72) Inventors: Yaozu An, Beijing (CN); Xinyu Xu, Beijing (CN); Qi Kong, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 344 days.

(21) Appl. No.: 17/912,342

(22) PCT Filed: Mar. 9, 2021

(86) PCT No.: PCT/CN2021/079690
§ 371 (c)(1),
(2) Date: Sep. 16, 2022

(87) PCT Pub. No.: WO2021/185121
PCT Pub. Date: Sep. 23, 2021

(65) Prior Publication Data
US 2023/0131518 A1    Apr. 27, 2023

(30) Foreign Application Priority Data
Mar. 17, 2020    (CN) .......................... 202010188303.6

(51) Int. Cl.
*G06V 10/774*    (2022.01)
*G06N 3/082*    (2023.01)
(Continued)

(52) U.S. Cl.
CPC .......... *G06V 10/774* (2022.01); *G06N 3/082* (2013.01); *G06V 10/82* (2022.01); *G06V 20/58* (2022.01); *G06V 20/56* (2022.01)

(58) Field of Classification Search
CPC ...... G06V 10/774; G06V 10/82; G06V 20/58; G06V 20/56; G06V 2201/08; G06V 10/77;
(Continued)

(56) References Cited

U.S. PATENT DOCUMENTS

2018/0157899 A1*    6/2018    Xu .......................... G06N 3/08
2018/0276489 A1*    9/2018    Xu .......................... G06V 10/82
(Continued)

FOREIGN PATENT DOCUMENTS

CN    107368885 A    11/2017
CN    107728620 A    2/2018
(Continued)

OTHER PUBLICATIONS

Liu, Zhuang, et al., Learning Efficient Convolutional Networks through Network Slimming, 2017 IEEE International Conference on Computer Vision, DOI 10.1109/ICCV.2017.298.
(Continued)

*Primary Examiner* — Ali Bayat
(74) *Attorney, Agent, or Firm* — K&L Gates LLP

(57) ABSTRACT

Provided are a model generation method and apparatus, an object detection method and apparatus, a device and a storage medium. The method includes acquiring multiple scaling coefficients of a batch normalization layer in an initially-trained intermediate detection model, where the intermediate detection model is obtained by training an original detection model based on multiple training samples, and each training sample includes a sample image and a sample annotation result of a known object in the sample image; screening a to-be-pruned coefficient from the multiple scaling coefficients according to values of the multiple scaling coefficients; and screening a to-be-pruned channel corresponding to the to-be-pruned coefficient from multiple
(Continued)

channels of the intermediate detection model and performing channel pruning on the to-be-pruned channel to generate an object detection model.

19 Claims, 5 Drawing Sheets

(51) Int. Cl.
*G06V 10/82* (2022.01)
*G06V 20/58* (2022.01)
*G06V 20/56* (2022.01)

(58) Field of Classification Search
CPC .. G06V 2201/07; G06N 3/082; G06N 3/0464; G06N 3/0495; G06N 3/0985; G06N 3/045; G06F 18/241; G06F 18/214; G06T 3/40; G06T 2207/30252
USPC .......................................................... 382/155
See application file for complete search history.

(56) References Cited

U.S. PATENT DOCUMENTS

| | | | |
|---|---|---|---|
| 2019/0251441 A1* | 8/2019 | Lu | G06N 3/082 |
| 2019/0294929 A1 | 9/2019 | Yao et al. | |
| 2020/0302289 A1* | 9/2020 | Ren | G06N 3/084 |
| 2021/0241117 A1* | 8/2021 | Wang | G06N 3/04 |
| 2023/0154202 A1* | 5/2023 | Liu | G06V 10/454 |
| | | | 382/103 |

FOREIGN PATENT DOCUMENTS

| | | | |
|---|---|---|---|
| CN | 109344921 A | 2/2019 | |
| CN | 110084181 A | 8/2019 | |
| CN | 110263841 A | 9/2019 | |
| CN | 110619391 A | 12/2019 | |
| CN | 110633747 A | 12/2019 | |
| CN | 110796168 A | 2/2020 | |
| CN | 111062382 A | 4/2020 | |
| CN | 111325342 A | 6/2020 | |
| CN | 110796168 B | 6/2023 | |
| JP | 2019159694 A | 9/2019 | |
| JP | 2019212206 A | 12/2019 | |
| WO | 2019205391 A1 | 10/2019 | |

OTHER PUBLICATIONS

Office Action from related Chinese Patent Application No. 2020101883036 issued Dec. 23, 2023.
Office Action from related Japanese Patent Application No. 2022-544673 dated Sep. 21, 2023.
Search Report from related Chinese Patent Application No. 2020101883036 dated Dec. 21, 2023.
Search Report from related European Patent Application No. 21771737.0 dated Nov. 24, 2023.
Yao, Yiwu, et al., Creating Lightweight Object Detectors with Model Compression for Deployment on Edge Devices, NetEase Ltd. Hangzhou Research Institute, Hangzhou, 310052, China, received Nov. 21, 2023.
Zhang, Pengyi, et al., SlimYOLOv3: Narrower, Faster and Better for Real-Time UAV Applications, 2019 IEEE/CVF International Conference on Computer Vision Workshop (ICCVW), DOI 10.1109/ICCVW.2019.00011.
Song, et al., Optimization of Structural Pruning Based on MobileNetV3, Automation & Information Engineering, vol. 40, No. 6, Dec. 15, 2019. With English Abstract.
PCT International Search Report dated Jun. 8, 2021, for International Patent Application No. PCT/CN2021/079690.
English translation of Search Report from related Chinese Patent Application No. 2020101883036 dated Mar. 27, 2020.
Search Report from related Chinese Patent Application No. 2020101883036 dated Mar. 27, 2024.

* cited by examiner

MODEL GENERATION METHOD AND APPARATUS, OBJECT DETECTION METHOD AND APPARATUS, DEVICE, AND STORAGE MEDIUM

CROSS-REFERENCE TO RELATED APPLICATIONS

This patent application is a 35 U.S.C. § 371 National Stage filing of International Application No. PCT/CN2021/079690, filed on Mar. 9, 2021, which application claims priority benefit to Chinese Patent Application No. 202010188303.6, filed on Mar. 17, 2020, the disclosures of which are incorporated herein by reference in their entireties.

TECHNICAL FIELD

Embodiments of the present application relate to the technical field of computer application, for example, a model generation method and apparatus, an object detection method and apparatus, a device and a storage medium.

BACKGROUND

The object detection technology lays the foundation for many computer vision tasks and can be used for determining whether there is a to-be-detected object of interest in a to-be-detected image and for accurately positioning the to-be-detected object. Moreover, combined with such technologies as object tracking and object re-recognition, the object detection technology can be applied to fields such as artificial intelligence systems, autonomous vehicle systems, smart robots and smart logistics.

In the implementation process of the present application, the inventors have found the following situations in the related art: Most object detection technologies are implemented based on a deep learning model that is prone to a slow detection speed due to its large size. This is particularly clearly seen in devices having limited computing resources, thereby making it difficult for the object detection technologies to directly apply in practical projects.

For example, in the field of smart logistics, the wide application of unmanned distribution vehicles can lower the distribution cost and improve the distribution efficiency, and the vision-based object detection technology is a very important technique required by unmanned distribution vehicles to perceive the surroundings. However, considering the mass production and cost, most onboard processors on unmanned distribution vehicles are composed based on Xvaier platforms having relatively limited computing resources. As a result, the deep learning model applied in such onboard processors is relatively slow in detection speed, directly affecting the environment perception capabilities of the unmanned distribution vehicles and thereby affecting the distribution efficiency of the unmanned distribution vehicles. Therefore, how to increase the detection speed of a deep learning model is crucial for the development of the field of smart logistics.

SUMMARY

Embodiments of the present application provide a model generation method and apparatus, an object detection method and apparatus, a device and a storage medium to achieve the effect of increasing the model detection speed by model compression.

In a first aspect, embodiments of the present application provide a model generation method. The method may include the steps below.

A plurality of scaling coefficients of a batch normalization layer in an initially-trained intermediate detection model is acquired, where the intermediate detection model is obtained by training an original detection model based on a plurality of training samples, and each of the plurality of training samples includes a sample image and a sample annotation result of a known object in the sample image.

A to-be-pruned coefficient is screened from the plurality of scaling coefficients according to values of the plurality of scaling coefficients.

A to-be-pruned channel corresponding to the to-be-pruned coefficient is screened from a plurality of channels of the intermediate detection model, and channel pruning is performed on the to-be-pruned channel to generate an object detection model.

In a second aspect, embodiments of the present application further provide an object generation method. The method may include the steps below.

The object detection model generated according to any one of the preceding methods and a to-be-detected image are acquired.

The to-be-detected image is input into the object detection model, and an object detection result of a to-be-detected object in the to-be-detected image is obtained according to an output result of the object detection model.

In a third aspect, embodiments of the present application further provide a model generation apparatus. The apparatus may include a first acquisition module, a first screening module and a model generation module.

The first acquisition module is configured to acquire a plurality of scaling coefficients of a batch normalization layer in an initially-trained intermediate detection model, where the intermediate detection model is obtained by training an original detection model based on a plurality of training samples, and each of the plurality of training samples includes a sample image and a sample annotation result of a known object in the sample image.

The first screening module is configured to screen a to-be-pruned coefficient from the plurality of scaling coefficients according to values of the plurality of scaling coefficients.

The model generation module is configured to screen a to-be-pruned channel corresponding to the to-be-pruned coefficient from a plurality of channels of the intermediate detection model and perform channel pruning on the to-be-pruned channel to generate an object detection model.

In a fourth aspect, embodiments of the present application further provide an object detection apparatus. The apparatus may include a second acquisition module and an objection detection module.

The second acquisition module is configured to acquire the object detection model generated according to any one of the preceding methods and a to-be-detected image.

The object detection module is configured to input the to-be-detected image into the object detection model and obtain an object detection result of a to-be-detected object in the to-be-detected image according to an output result of the object detection model.

In a fifth aspect, embodiments of the present application further provide a device. The device may include at least one processor and a memory configured to store the at least one program. The at least one program, when executed by the at least one processor, causes the at least one processor to perform the model generation method or the object detection method according to any embodiment of the present application.

In a sixth aspect, embodiments of the present application further provide a computer-readable storage medium storing a computer program. The computer program, when executed by a processor, implements the model generation method or the object detection method according to any embodiment of the present application.

DETAILED DESCRIPTION

Embodiment One

Figure 1:
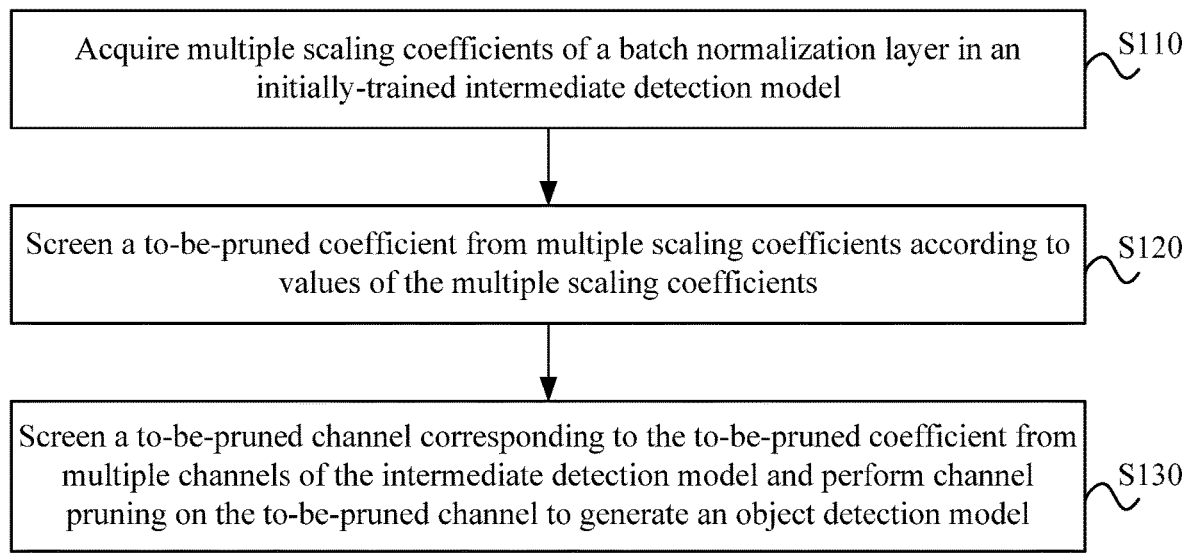
FIG. 1 is a flowchart of a model generation method according to embodiment one of the present application.

FIG. 1 is a flowchart of a model generation method according to embodiment one of the present application. This embodiment is applicable to cases of compressing a deep learning model in the object detection technology. The method is executable by a model generation apparatus provided in embodiments of the present application. The apparatus may be implemented by at least one of software or hardware and integrated into electronic devices.

Referring to FIG. 1, the method according to this embodiment of the present application includes S110 to S130.

In S110, multiple scaling coefficients of a batch normalization layer in an initially-trained intermediate detection model are acquired, where the intermediate detection model is obtained by training an original detection model based on multiple training samples, and each training sample includes a sample image and a sample annotation result of a known object in the sample image.

An untrained original detection model is acquired. The original detection model is a model for vision detection among deep learning models and may be classified as anchor-based, anchor-free or a fusion of the two. The difference between these types of models lies in whether to use an anchor to extract a candidate box. The anchor, also called an anchor box, is a group of rectangular boxes obtained on a training sample based on a clustering algorithm before model training.

Anchor-based original detection models include a faster region-based convolutional neural network (faster R-CNN), Single Shot MultiBox Detector (SSD), You Only Look Once v2 (YOLOv2), You Only Look Once v3 (YOLOv3), etc. Anchor-free original detection models include CornerNet, ExtremeNet, CenterNet, FullyConvolutionalOne-Stage (FCOS), etc. Original detection models in which the anchor-based branch and the anchor-free branch are fused include feature selective anchor-free (FSAF), SFace, Guided Anchoring Region Proposal Network (GA-RPN), etc. As a one-stage detection model, an SSD has no region proposal generation stage and directly generates the category probability and position coordinates of a to-be-detected object so that the SSD has a greater advantage in detection speed and can run better on unmanned distribution vehicles and mobile terminals.

Therefore, in one example, the original detection model may be an SSD. On this basis, the backbone network of the SSD may be an inception_v3 structure.

Therefore, after the original detection model is trained based on the multiple training samples, the initially-trained intermediate detection model may be obtained, and each training sample may include the sample image and the sample annotation result of the known object in the sample image. The sample image may be a frame of an image, a video sequence, etc. The sample annotation result may be a category probability and position coordinates.

It is to be noted that each convolution layer of the original detection model is followed by one batch normalization (BN) layer and the BN layer can normalize the scale of an output result of each convolution layer. This can prevent a gradient loss and a gradient overflow in the training process. The BN layer includes a scaling coefficient (gamma coefficient) and an offset coefficient (beta coefficient). In each BN layer, the number of scaling coefficients is the same as the number of channels in a convolution layer adjacent to the each BN layer. That is, each scaling coefficient corresponds to a respective channel in the convolution layer. For example, if a certain BN layer has 32 scaling coefficients, the convolution layer adjacent to the certain BN layer includes 32 channels, and the BN layer also includes 32 channels. Moreover, in the training stage and the application stage of the original detection model, each scaling coefficient is multiplied by the respective channel in the convolution layer. That is, whether a certain scaling coefficient exists directly affects whether the corresponding channel in the convolution layer plays a role. Therefore, the multiple scaling coefficients of the batch normalization layer in the intermediate detection model may be acquired, and then which channels in the intermediate detection model need to be subjected to channel pruning is determined according to the multiple scaling coefficients.

In S120, a to-be-pruned coefficient is screened from the multiple scaling coefficients according to values of the multiple scaling coefficients.

There are many implementation modes for the to-be-pruned coefficient being screened from the multiple scaling coefficients according to the values of the multiple scaling coefficients. For example, the values of the multiple scaling coefficients may be sorted, a median among the multiple scaling coefficients is obtained according to a sorting result, and the to-be-pruned coefficient is screened from the multiple scaling coefficients according to the median; the average value of the values of the multiple scaling coefficients may be calculated, the to-be-pruned coefficient is screened from the multiple scaling coefficients according to the average value; or a pruning threshold of the multiple scaling coefficients is obtained according to the values of the multiple scaling coefficients and a preset pruning rate, and the to-be-pruned coefficient is screened from the multiple scaling coefficients according to the pruning threshold, where the to-be-pruned coefficient may be a scaling coefficient whose value is less than or equal to the pruning threshold.

In S130, a to-be-pruned channel corresponding to the to-be-pruned coefficient is screened from multiple channels of the intermediate detection mode, and channel pruning is performed on the to-be-pruned channel to generate an object detection model.

The multiple scaling coefficients are in one-to-one correspondence with multiple channels in a certain convolution layer. The multiple channels in the certain convolution layer are also in one-to-one correspondence with multiple channels in a BN layer adjacent to the certain convolution layer. Therefore, to-be-pruned channels may be screened from the multiple channels of the intermediate detection model according to the to-be-pruned coefficient and the to-be-pruned channels are channels that have less importance and may be channels in a certain convolution layer or a certain BN layer.

The channel pruning may be performed on the to-be-pruned channel to generate the object detection model so that the effect of model compression is achieved. Channel pruning is a structured compression mode to simplify a model by removing redundant channels in the model. Moreover, after the channel pruning is performed on the to-be-pruned channels, convolution kernels corresponding to the to-be-pruned channels are removed accordingly so that the amount of convolution computation is also reduced by channel pruning. Exemplarily, if a certain convolution layer has 32 channels, then a BN layer adjacent to the certain convolution layer also has 32 channels. Each channel in the BN layer includes scaling coefficients and offset coefficients. The to-be-pruned coefficient is screened from the scaling coefficients. Therefore, according to the to-be-pruned coefficient, which channels in the BN layer are to-be-pruned channels may be determined according to the to-be-pruned coefficient, and which channels in the convolution layer are to-be-pruned channels may be determined accordingly.

In an embodiment, the implementation of the channel pruning may be as follows: An output channel of the current convolution layer corresponding to the current pruning coefficient among multiple to-be-pruned coefficients and an input channel of the next convolution layer of the current convolution layer are screened from the multiple channels of the multiple convolution layers in the intermediate detection model and are regarded as the to-be-pruned channel.

This is because the output channel of the current convolution layer is the input channel of the next convolution layer of the current convolution layer. Exemplarily, if the output channels of the current convolution layer are 1-32, so are the input channels of the next convolution layer of the current convolution layer. In this case, if the output channel 17 of the current convolution layer corresponding to the current pruning coefficient is the to-be pruned channel, so is the input channel 17 of the next convolution layer of the current convolution layer.

In the technical scheme of this embodiment of the present application, the multiple scaling coefficients of the batch normalization layer in the initially-trained intermediate detection model are acquired, the to-be-pruned coefficient is screened from the multiple scaling coefficients according to the values of the multiple scaling coefficients, and since there is a correspondence between the to-be-pruned coefficient and the to-be-pruned channel, the to-be-pruned channel corresponding to the to-be-pruned coefficient is screened from the multiple channels of the intermediate detection model, and the channel pruning is performed on the to-be-pruned channel to generate the object detection model. In the preceding technical scheme, the channel pruning is combined with the intermediate detection model, and the channel pruning may be performed on the intermediate detection model according to the scaling coefficients in the initially-trained intermediate detection model so that the effect of increasing the model detection speed by model compression can be achieved.

In a technical scheme, the preceding model generation method may further include the following:

A prunable convolution layer is screened from multiple convolution layers of the intermediate detection model, where the prunable convolution layer includes a convolution layer other than a convolution layer in classification and regression branches and/or a 1*1 convolution layer; a scaling coefficient corresponding to the prunable convolution layer is screened from the multiple scaling coefficients, where the scaling coefficient corresponding to the prunable convolution layer is an object scaling coefficient; and accordingly, that the to-be-pruned coefficient is screened from the multiple scaling coefficients according to the values of the multiple scaling coefficients includes that the to-be-pruned coefficient is screened from multiple object scaling coefficients according to values of the multiple object scaling coefficients.

The original detection model generally includes two parts: a backbone network and classification and regression branches. The backbone network may be used for extracting a feature map. The classification and regression branches are a classification branch and a regression branch that are branched out from the backbone network and may be used for classifying or regressing the extracted feature map. The types of classification and regression are generally fixed, so a convolution layer in the classification and regression branches can be kept fixed as much as possible. Thus, the fixed output dimension can be ensured, and the execution code can be simplified. Therefore, the convolution layer other than at least one of the convolution layer in the classification and regression branches or the 1*1 convolution layer may be regarded as the prunable convolution layer, and the to-be-pruned coefficient is screened from the multiple object scaling coefficients in the prunable convolution layer.

In a technical scheme, after the channel pruning is performed on the to-be-pruned channel, a pruning detection model may be generated first, and then fine-tuning training is performed on the pruning detection model to generate the object detection model.

That is, the fine-tuning training may be performed on the pruning detection model simplified by the channel pruning to restore the detection effect. That is, when the model is compressed, the original performances of the model are simultaneously retained as much as possible. The fine-tuning process may be as follows: A historical image and a historical annotation result of a known object in the historical image are acquired and regarded as a set of historical samples, and a pruning detection model is trained based on multiple historical samples to obtain the object detection model. It is to be noted that the historical sample is generally the same as the preceding training sample. That is, in the fine-tuning training, the historical image may be the same as the sample image, and the historical annotation result may be the same as the sample annotation result.

Embodiment Two

Figure 2:
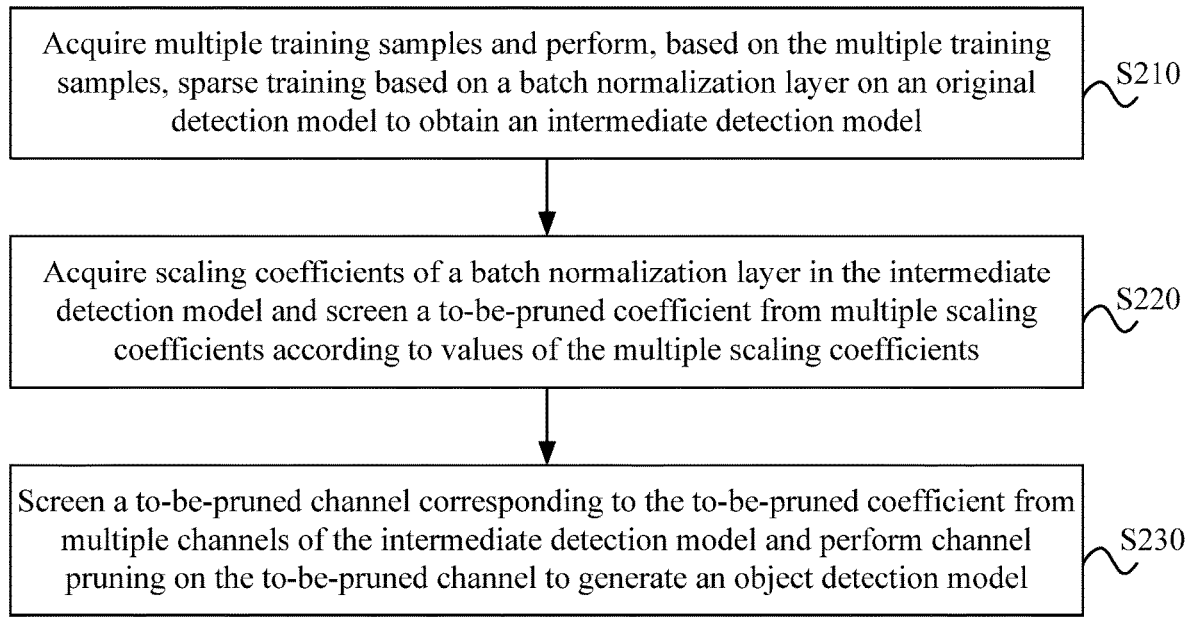
FIG. 2 is a flowchart of a model generation method according to embodiment two of the present application.

FIG. 2 is a flowchart of a model generation method according to embodiment two of the present application. Refining is made in this embodiment based on the preceding technical schemes.

In an embodiment, the preceding model generation method may further include that the multiple training samples are acquired, and sparse training based on the batch normalization layer is performed, based on the multiple training samples, on the original detection model to obtain the intermediate detection model.

Referring to FIG. 2, the method according to this embodiment includes S210 to S230.

In S210, multiple training samples are acquired, and sparse training based on a batch normalization layer is performed, based on the multiple training samples, on an original detection model to obtain an intermediate detection model, where each training sample includes a sample image and a sample annotation result of a known object in the sample image.

When the BN layer-based sparse training is performed on the original detection model, an intermediate detection model having a sparse BN layer may be obtained. That is, sparsity is introduced into the dense connection of the original detection model.

Exemplarily, one scheme of the BN layer-based sparse training is to apply an L1 regular constraint to each scaling coefficient in the original detection model to cause the original detection model to adjust parameters toward the direction of the structural sparsity.

In this case, a scaling coefficient (gamma coefficient) in the BN layer plays a role equal to a switch coefficient in an information flow channel and controls the closing of the switch of the information flow channel.

The reason for this configuration is that in the model training process, more scaling coefficients may be adjusted to be 0 by applying an L1 regular constraint to the scaling coefficients. Therefore, in the model training stage and the model application stage, a scaling coefficient is multiplied by a corresponding channel in the convolution layer, so when more scaling coefficients are 0, the corresponding channels in the convolution layer do not play any role. That is, the effect of channel pruning is also achieved by greatly compressing the scaling coefficients. On this basis, when the to-be-pruned channel is screened according to the preset pruning rate, the more scaling coefficients whose values are 0 in the intermediate detection model, the lower probability of pruning the channels corresponding to the scaling coefficients whose values are not 0. In this manner, the more consistent the network structure of the generated object detection model and the network structure of the intermediate detection model, the more consistent the detection performances of these two models. That is, the effect of model compression can be achieved while the detection performances are ensured.

On this basis, an object loss function in the original detection model may be composed of an original loss function and an L1 regular constraint function. The L1 regular constraint function may include a loss function performing an L1 regular constraint on the multiple scaling coefficients. That is, L1 regular constraint items of the scaling coefficients of the BN layer are introduced based on the original loss function. In this manner, in the training process, the minimum value may be solved according to the object loss function, and multiple parameter values in the model are adjusted according to the solved result.

In an embodiment, the object loss function L may be expressed by the following formula:

$$L = \sum_{(x,y)} l(f(x, W), y) + \lambda \sum_{\gamma \in \Gamma} g(\gamma)$$

where x denotes a sample image, y denotes a sample annotation result of the sample image, W denotes a parameter value in the original detection model, f(x, W) denotes a sample prediction result of a known object in the sample image, γ denotes a scaling coefficient, λ denotes a penalty coefficient, l( ) denotes the original loss function, g( ) denotes the L1 regular constraint function, and Γ denotes a set of all scaling coefficients in the original detection model. Moreover, the L1 regular constraint function is only applied to the scaling coefficients of the BN layer, so when a gradient is updated by back propagation, the gradient $\gamma^{grad}$ of a scaling coefficient needs to be added with a [product term of the scaling coefficient sign (γ) and a penalty coefficient λ], where the formula is as follows:

$$\gamma^{grad} = \gamma^{grad} + \lambda * \text{sign}(\gamma).$$

In S220, multiple scaling coefficients of a batch normalization layer in the intermediate detection model are acquired, and a to-be-pruned coefficient is screened from the multiple scaling coefficients according to values of the multiple scaling coefficients.

In S230, a to-be-pruned channel corresponding to the to-be-pruned coefficient is screened from multiple channels of the intermediate detection model, and channel pruning is performed on the to-be-pruned channel to generate an object detection model.

In the technical scheme of this embodiment of the present application, the intermediate detection model having a sparse BN layer may be obtained by performing the BN layer-based sparse training on the original detection model based on the multiple training samples, and the object detection model may be generated by performing the channel pruning on the intermediate detection model, and the detection performances of the two models are relatively consistent. That is, the effect of model compression can be achieved while the detection performances are ensured.

Embodiment Three

Figure 3:
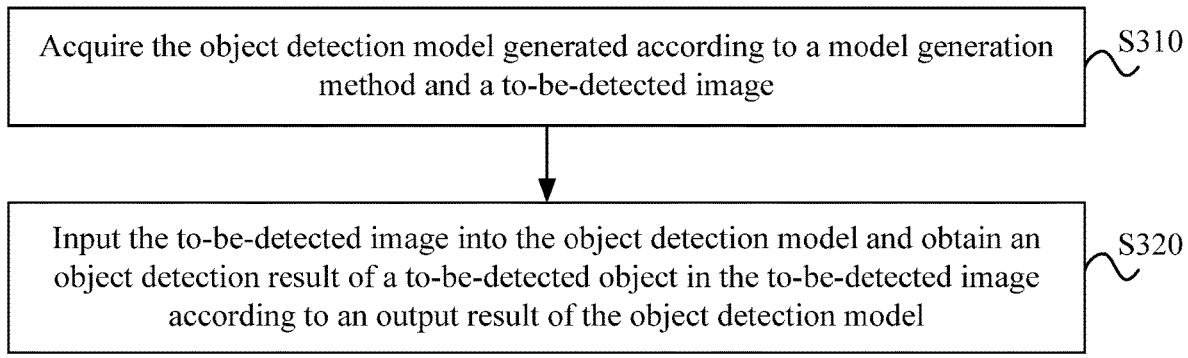
FIG. 3 is a flowchart of an object detection method according to embodiment three of the present application.

FIG. 3 is a flowchart of an object detection method according to embodiment three of the present application. This embodiment is applicable to cases of performing object detection on a to-be-detected image based on the object detection model generated by the method described in any one of the preceding embodiments. The method is executable by an object detection apparatus provided in embodiments of the present application. The apparatus may be implemented by at least one of software or hardware and integrated into electronic devices.

Referring to FIG. 3, the method according to this embodiment of the present application includes S310 to S320.

In S310, the object detection model generated according to the method of any one of the preceding embodiments and a to-be-detected image are acquired.

Figure 4A:
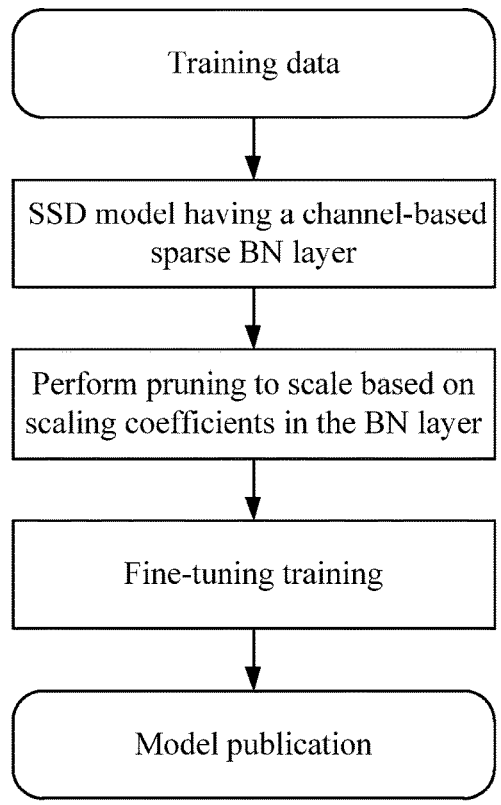
FIG. 4A is a model compression flowchart of the object detection method according to embodiment three of the present application.

The to-be-detected image may be a frame of an image, a video sequence, etc. The object detection model may be a vision detection model generated according to the method described in any one of the preceding embodiments. Exemplarily, a method for generating an object detection model may be shown as FIG. 4A.

First, with an original SSD detection model as the basis, and the inception_v3 structure as the backbone network, in the model training period, in the case where original parameters are retained, the model is enabled to adjust parameters toward the direction of structural sparsity through applying an L1 regular constraint to the gamma coefficients in the BN layer adjacent to a convolution layer so that the BN layer becomes sparse. Second, after the BN layer-based sparse training is completed, according to the scaling coefficients of the BN layer, channels in the corresponding convolution layer and BN layer in the initially-trained intermediate detection model are pruned according to the preset pruning rate so that the model can be simplified, and the detection speed can be increased. Last, fine-tuning training is performed on the model simplified by channel pruning to restore the detection effect.

Figure 4B:
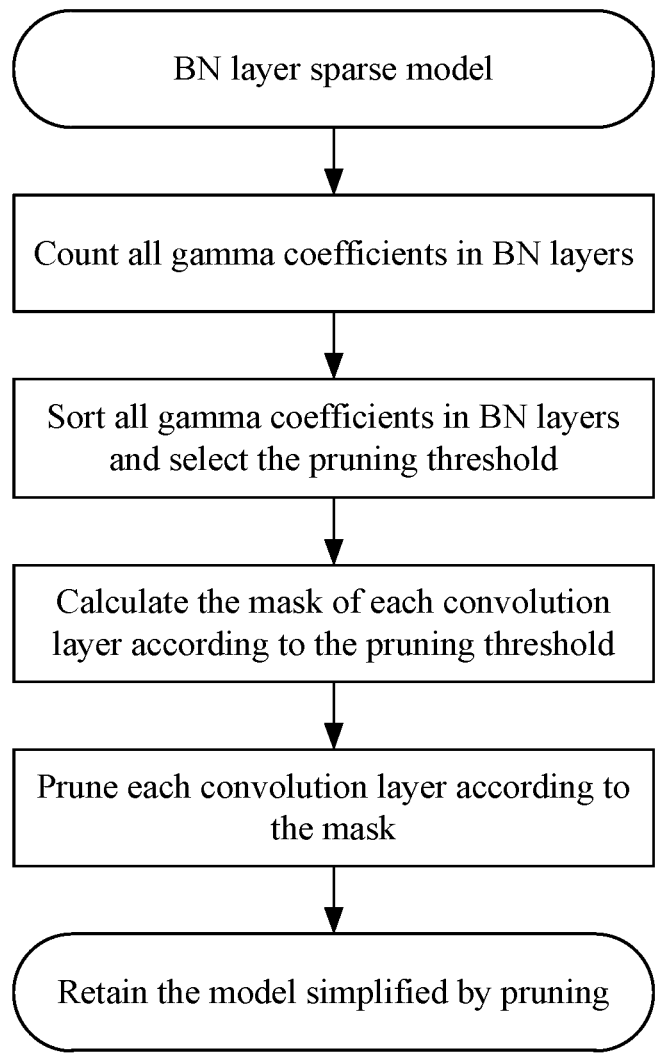
FIG. 4B is a model pruning flowchart of the object detection method according to embodiment three of the present application.

The preceding channel pruning process may be shown as FIG. 4B. First, which convolution layers to be subjected to channel pruning needs to be determined, and there are two limits in this embodiment of the present application: Neither the 1*1 convolution layer nor the convolution layer in the classification and regression branches is pruned, which can ensure that the output dimension remains unchanged. Second, the gamma coefficients in BN layers corresponding to the rest prunable convolution layers are counted and sorted, and the pruning threshold of the gamma coefficients is calculated according to the preset pruning rate. Then, channels in the convolution layers and the BN layers are selected according to the pruning threshold, and channels corresponding to the gamma coefficients whose values are greater than the pruning threshold are retained, to determine the mask of retainable channels in the BN layers and the convolution layers adjacent to the BN layers. Last, according to the mask, the corresponding channels in the convolution layers and the BN layers are retained, and the channels that are not retained are pruned.

In S320, the to-be-detected image is input into the object detection model, and an object detection result of a to-be-detected object in the to-be-detected image is obtained according to an output result of the object detection model.

In one embodiment in which the example in the background is used as an example, the preceding object detection method is applicable to vision objection detection on unmanned distribution vehicles in the field of smart logistics.

Though most onboard processors on unmanned distribution vehicles are composed based on Xvaier platforms having relatively limited computing resources, the objection detection model involved in the preceding object detection method has a small scale and fast detection speed and thus can still implement the real unmanned operation of the unmanned distribution vehicles under the constraint of limited computing resources. Moreover, structured pruning is performed at the channel level, so the generated simplified model can directly run on a mature framework such as Pytorch, MXnet or TensorFlow or run on a hardware platform such as a graphics processing unit (GPU) or a field-programmable gate array (FPGA), without the support of special algorithm libraries and thus is more convenient to apply.

To verify the detection accuracy of the preceding object detection method, this method is tested for detection accuracy on the five subsets (car, pedestrian, truck, bus, and rider) of the University of California Berkeley DeepDrive (BDD) dataset. The quantitative results are shown in the following two tables. As seen from the data in the tables, in the case where part of the convolution layers and the BN layers are retained, the object detection method with structured pruning in this embodiment of the present application can achieve a relatively noticeable compression effect while the detection result mAP (the average of the five subsets) has only a slight decrease.

| Preset Pruning Rate | Model Parameter Quantity | Amount of Model Computation (FLOPS) |
| --- | --- | --- |
| Base | 28.29M | 9.45 G |
| 30% | 21.55M | 5.97 G |
| 50% | 16.76M | 5.60 G |
| 80% | 11.24M | 4.94 G |

| Preset Pruning Rate | mAP | Car | Pedestrian | Truck | Bus | Rider |
| --- | --- | --- | --- | --- | --- | --- |
| Base | 37.56 | 56.66 | 22.95 | 44.56 | 44.37 | 19.28 |
| 80% | 37.32 | 56.55 | 23.26 | 44.11 | 44.13 | 18.55 |

In the technical scheme of this embodiment of the present application, object detection may be performed on the to-be-detected image based on the generated object detection model. Since the object detection model is a simplified model after model compression, the detection speed of the to-be-detected object in the to-be-detected image can be effectively increased, and the original performances of the model can be retained as much as possible.

Embodiment Four

Figure 5:
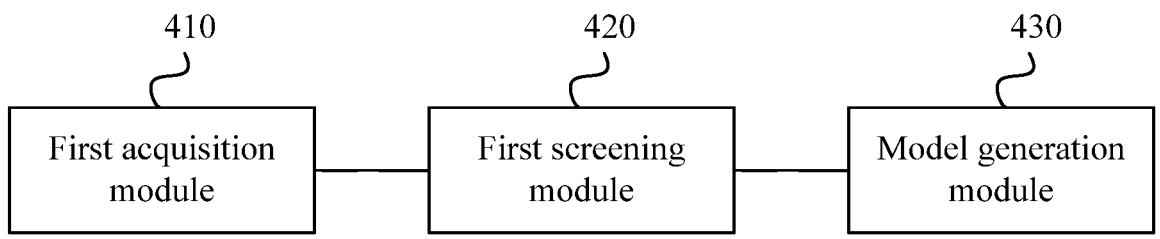
FIG. 5 is a block diagram of a model generation apparatus according to embodiment four of the present application.

FIG. 5 is a block diagram of a model generation apparatus according to embodiment four of the present application. The apparatus is configured to perform the model generation method of any one of the preceding embodiments. The apparatus belongs to the same invention concept as the model generation methods of the preceding embodiments. For details not described in this embodiment of the model generation apparatus, reference may be made to the embodiments of the preceding model generation methods. Referring to FIG. 5, the apparatus may include a first acquisition module 410, a first screening module 420 and a model generation module 430.

The first acquisition module 410 is configured to acquire multiple scaling coefficients of a batch normalization layer in an initially-trained intermediate detection model, where the intermediate detection model is obtained by training an original detection model based on multiple training samples, and each training sample includes a sample image and a sample annotation result of a known object in the sample image.

The first screening module 420 is configured to screen a to-be-pruned coefficient from the multiple scaling coefficients according to values of the multiple scaling coefficients.

The model generation model 430 is configured to screen a to-be-pruned channel corresponding to the to-be-pruned coefficient from multiple channels of the intermediate detection model and perform channel pruning on the to-be-pruned channel to generate an object detection model.

In an embodiment, the first screening module 420 may be configured to obtain a pruning threshold of the multiple scaling coefficients according to the values of the multiple scaling coefficients and the preset pruning rate and screen the to-be-pruned coefficient from the multiple scaling coefficients according to the pruning threshold.

In an embodiment, based on the preceding apparatus, the apparatus may further include a second screening module and a third screening module.

The second screening module is configured to screen a prunable convolution layer from multiple convolution layers of the intermediate detection model, where the prunable convolution layer includes a convolution layer other than at least one of a convolution layer in classification and regression branches or a 1*1 convolution layer.

The third screening module is configured to screen a scaling coefficient corresponding to the prunable convolution layer from the multiple scaling coefficients, where the scaling coefficient corresponding to the prunable convolution layer is an object scaling coefficient.

In an emodiment, the first screening module 420 may be configured to screen the to-be-pruned coefficient from multiple object scaling coefficients according to values of the multiple object scaling coefficients.

In an embodiment, the model generation module 430 may include a to-be-pruned channel screening unit.

The to-be-pruned channel screening unit is configured to screen, from multiple channels of multiple convolution layers of the intermediate detection model, an output channel of the current convolution layer corresponding to the current pruning coefficient among the multiple to-be-pruned coefficients and an input channel of the next convolution layer of the current convolution layer and regard the output channel and the input channel as the to-be-pruned channel.

In an emodiment, based on the preceding apparatus, the apparatus may further include a third acquisition module.

The third acquisition module is configured to acquire the multiple training samples and sparse training based on the batch normalization layer is performed, based on the multiple training samples, on the original detection model to obtain the original detection model.

In an emodiment, an object loss function in the original detection model is composed of an original loss function and an L1 regular constraint function. The L1 regular constraint function includes a loss function performing an L1 regular constraint on the multiple scaling coefficients.

In an embodiment, the object loss function L is expressed by the following formula:

$$L = \sum_{(x,y)} l(f(x, W), y) + \lambda \sum_{\gamma \in \Gamma} g(\gamma)$$

where x denotes a sample image, y denotes a sample annotation result of the sample image, W denotes a parameter value in the original detection model, f(x, W) denotes a sample prediction result of a known object in the sample image, $\gamma$ denotes a scaling coefficient, $\lambda$ denotes a penalty coefficient, l( ) denotes the original loss function, g( ) denotes the L1 regular constraint function, and $\Gamma$ denotes a set of all scaling coefficients in the original detection model.

In an embodiment, the model generation module 430 may include a channel pruning unit and a fine-tuning training unit.

The channel pruning unit is configured to perform channel pruning on the to-be-pruned channel to obtain a pruning detection model.

The fine-tuning training unit is configured to perform fine-tuning training on the pruning detection model to generate the object detection model.

In the model generation apparatus according to embodiment four of the present application, the multiple scaling coefficients of the batch normalization layer in the initially-trained intermediate detection model are acquired by the first acquisition module, the first screening module may screen the to-be-pruned coefficient from the multiple scaling coefficients according to the values of the multiple scaling coefficients, and since there is a correspondence between the to-be-pruned coefficient and the to-be-pruned channel, the model generation module may screen the to-be-pruned channel corresponding to the to-be-pruned coefficient from the multiple channels of the intermediate detection model and perform the channel pruning on the to-be-pruned channel to generate the object detection model. In the preceding apparatus, the channel pruning is combined with the intermediate detection model, and the channel pruning may be performed on the intermediate detection model according to the scaling coefficients in the initially-trained intermediate detection model so that the effect of increasing the model detection speed by model compression can be achieved.

The model generation apparatus according to this embodiment of the present application may perform the model generation method according to any embodiment of the present application and has functional modules corresponding to the executed method.

It is to be noted that units and modules included in this embodiment of the model generation apparatus are only divided according to functional logic but are not limited to such division as long as the corresponding functions can be implemented. In addition, the specific names of the functional units are only used for distinguishing between each other and are not intended to limit the scope of the present application.

Embodiment Five

Figure 6:
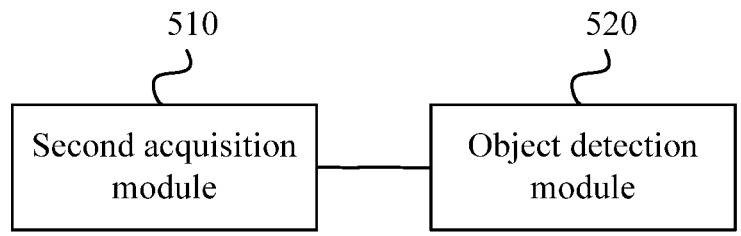
FIG. 6 is a block diagram of an object detection apparatus according to embodiment five of the present application.

FIG. 6 is a block diagram of an object detection apparatus according to embodiment five of the present application. The apparatus is configured to perform the object detection method according to any one of the preceding embodiments. The apparatus belongs to the same invention concept as the object detection method of the preceding embodiments. For details not described in this embodiment of the object detection apparatus, reference may be made to the embodiments of the preceding object detection method. Referring to FIG. 6, the apparatus may include a second acquisition module 510 and an object detection module 520.

The second acquisition module 510 is configured to acquire the object detection model generated according to any method of embodiment one and embodiment two and a to-be-detected image.

The object detection module 520 is configured to input the to-be-detected image into the object detection model and obtain an object detection result of a to-be-detected object in the to-be-detected image according to an output result of the object detection model.

In the object detection apparatus according to embodiment five of the present application, object detection may be performed on the to-be-detected image based on the generated object detection model through the inter-coordination between the second acquisition module and the object detection module, and the object detection model is a simplified model after model compression so that the detection speed of the to-be-detected object in the to-be-detected image can be effectively increased, and the original performances of the model can be retained as much as possible.

The object detection apparatus according to this embodiment of the present application may perform the object detection method according to any embodiment of the present application and has functional modules corresponding to the executed method.

It is to be noted that units and modules included in this embodiment of the object detection apparatus are only divided according to functional logic but are not limited to such division as long as the corresponding functions can be implemented. In addition, the specific names of the functional units are only used for distinguishing between each other and are not intended to limit the scope of the present application.

Embodiment Six

Figure 7:
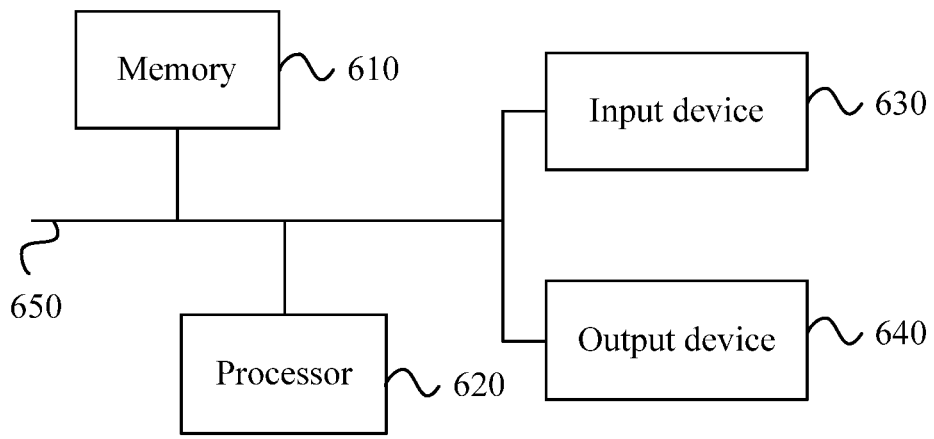
FIG. 7 is a structural diagram of a device according to embodiment six of the present application.

FIG. 7 is a structural diagram of a device according to embodiment six of the present application. As shown in FIG. 7, the device includes a memory 610, a processor 620, an input device 630 and an output device 640. At least one processor 620 may be provided in the device, and one processor 620 is used as an example in FIG. 7. The memory 610, the processor 620, the input device 630, and the output device 640 in the device may be connected via a bus or in other manners, and the connection via the bus 650 is used as an example in FIG. 7.

As a computer-readable storage medium, the memory 610 may be configured to store software programs, computer-executable programs and modules, such as program instructions/modules corresponding to the model generation methods in the embodiments of the present application (such as the first acquisition module 410, the first screening module 420 and the model generation module 430 in the model generation apparatus), or program instructions/modules corresponding to the object detection method in the embodiments of the present application (such as the second acquisition model 510 and the object detection module 520 in the object detection apparatus). The processor 620 is configured to operate software programs, instructions and modules stored in the memory 610 to perform functional applications and data processing of the device, that is, to implement the preceding model generation method or the object detection method.

The memory 610 may mainly include a program storage region and a data storage region. The program storage region may store an operating system and an application program required by at least one function; and the data storage region may store data created depending on the use of the device. In addition, the memory 610 may include a high speed random-access memory and may also include a non-volatile memory, for example, at least one disk memory element, flash memory element or another non-volatile solid-state memory element. In some examples, the memory 610 may include memories that are remotely disposed relative to the processor 620 and may be connected to the device via a network. Examples of the preceding network include, but are not limited to, the Internet, an intranet, a local area network, a mobile communication network and a combination thereof.

The input device 630 may be configured to receive input digital or character information and generate key signal input related to user settings and function control of the apparatus. The output device 640 may include a display screen and other display devices.

Embodiment Seven

Embodiment seven of the present application provides a storage medium including computer-executable instructions which, when executed by a computer processor, are used for causing the computer processor to perform a model generation method. The method includes the steps below.

Multiple scaling coefficients of a batch normalization layer in an initially-trained intermediate detection model are acquired, where the intermediate detection model is obtained by training an original detection model based on multiple training samples, and each training sample includes a sample image and a sample annotation result of a known object in the sample image.

A to-be-pruned coefficient is screened from the multiple scaling coefficients according to values of the multiple scaling coefficients.

A to-be-pruned channel corresponding to the to-be-pruned coefficient is screened from multiple channels of the intermediate detection model, and channel pruning is performed on the to-be-pruned channel to generate an object detection model.

Certainly, in the storage medium including computer-executable instructions according to this embodiment of the present application, the computer-executable instructions execute not only the preceding method operations but also related operations in the model generation methods according to any embodiment of the present application.

Embodiment Eight

Embodiment eight of the present application provides a storage medium including computer-executable instructions which, when executed by a computer processor, are used for causing the computer processor to perform an object detection method. The method includes the steps below.

The object detection model generated according to any method described in embodiment one and embodiment two and a to-be-detected image are acquired.

The to-be-detected image is input into the object detection model, and an object detection result of a to-be-detected object in the to-be-detected image is obtained according to an output result of the object detection model.

Embodiment Nine

Figure 8:
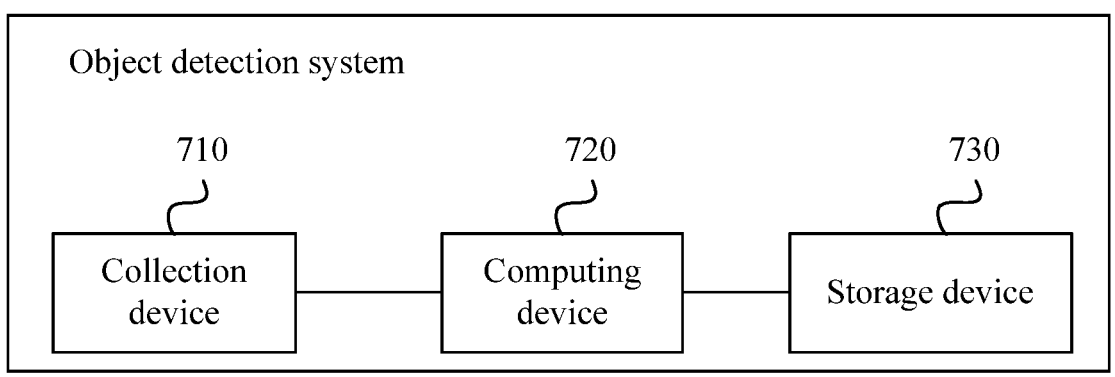
FIG. 8 is a structural diagram of an object detection system according to embodiment nine of the present disclosure.

An embodiment of the present application further provides an object detection system. Referring to FIG. 8, the system includes a collection device 710, a computing device 720 and a storage device 730. The storage device 730 is configured to store the object detection model generated in embodiment one or embodiment two. The collection device 710 is configured to collect a to-be-detected image. The computing device 720 is configured to load the to-be-detected image and the object detection model, input the to-be-detected image into the object detection model and obtain an object detection result of a to-be-detected object in the to-be-detected image according to an output result of the object detection model.

Embodiment Ten

Figure 9:
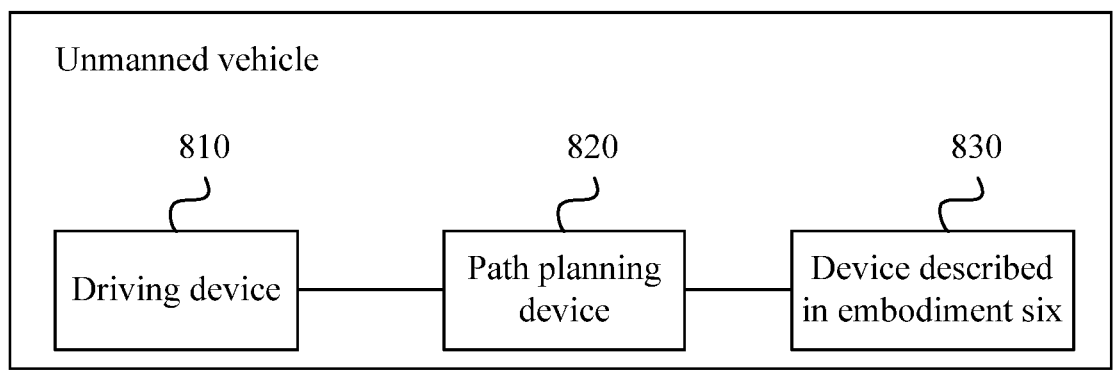
FIG. 9 is a structural diagram of an unmanned vehicle according to embodiment ten of the present application.

An embodiment of the present application further provides an unmanned vehicle. Referring to FIG. 9, the unmanned vehicle includes a driving device 810, a path planning device 820 and the device 830 described in embodiment seven. The driving device 810 is configured to drive the unmanned vehicle to run according to a path planned by the path planning device 820. The device 830 described in embodiment six is configured to detect a to-be-detected object in the to-be-detected image. The path planning device 820 is configured to plan a path of the unmanned vehicle according to a detection result of the to-be-detected object in the to-be-detected image detected by the device described in embodiment six.

From the preceding description of embodiments, it will be apparent to those skilled in the art that the present application may be implemented using software and necessary general-purpose hardware, or may be implemented by hardware. Based on this understanding, the technical schemes of the present application substantially, or the part contributing to the related art, may be embodied in the form of a software product. The computer software product may be stored in a computer-readable storage medium, such as a computer floppy disk, a read-only memory (ROM), a random-access memory (RAM), a flash, a hard disk or an optical disk and includes several instructions for causing a computer device (which may be a personal computer, a server or a network device) to execute the methods described in the embodiments of the present application.

What is claimed is:

1. A model generation method, performed by a model generation apparatus, wherein the model generation apparatus comprises a first processor, and a first memory configured to store a first program; wherein the first program, when executed by the model generation apparatus, causes the first processor to perform the model generation method; the model generation method comprising:
   acquiring, by the first processor, a plurality of scaling coefficients of a batch normalization layer in an initially-trained intermediate detection model, wherein the intermediate detection model is obtained by training an original detection model based on a plurality of training samples, and each of the plurality of training samples comprises a sample image and a sample annotation result of a known object in the sample image;
   screening, by the first processor, a first coefficient from the plurality of scaling coefficients according to values of the plurality of scaling coefficients; and
   screening, by the first processor, a first channel corresponding to the first coefficient from a plurality of channels of the intermediate detection model, and performing, by the first processor, channel pruning on the first channel to generate an object detection model.

2. The model generation method according to claim 1, wherein screening, by the first processor, the first coefficient from the plurality of scaling coefficients according to the values of the plurality of scaling coefficients comprises:
   obtaining, by the first processor, a pruning threshold of the plurality of scaling coefficients according to the values of the plurality of scaling coefficients and a preset pruning rate, and screening, by the first processor, the first coefficient from the plurality of scaling coefficients according to the pruning threshold.

3. The model generation method according to claim 1, further comprising:
   screening, by the first processor, a prunable convolution layer from a plurality of convolution layers of the intermediate detection model, wherein the prunable convolution layer comprises a convolution layer other than at least one of a convolution layer in classification and regression branches or a 1*1 convolution layer; and
   screening, by the first processor, a scaling coefficient corresponding to the prunable convolution layer from the plurality of scaling coefficients, wherein the scaling coefficient corresponding to the prunable convolution layer is an object scaling coefficient;
   wherein screening, by the first processor, the first coefficient from the plurality of scaling coefficients according to the values of the plurality of scaling coefficients comprises: screening, by the first processor, the first coefficient from a plurality of object scaling coefficients according to values of the plurality of object scaling coefficients.

4. The model generation method according to claim 1, wherein a plurality of first coefficients are provided; and
   wherein screening, by the first processor, the first channel corresponding to the first coefficient from the plurality of channels of the intermediate detection model comprises:
   screening, by the first processor from a plurality of channels of a plurality of convolution layers of the intermediate detection model, an output channel of a current convolution layer corresponding to a current pruning coefficient among the plurality of first coefficients and an input channel of a next convolution layer of the current convolution layer, and regarding, by the first processor, the output channel and the input channel as the first channel.

5. The model generation method according to claim 1, further comprising:
   acquiring, by the first processor, the plurality of training samples, and performing, by the first processor based on the plurality of training samples, sparse training based on the batch normalization layer on the original detection model to obtain the intermediate detection model.

6. The model generation method according to claim 5, wherein an object loss function in the original detection model is composed of an original loss function and an L1 regular constraint function, and the L1 regular constraint function comprises a loss function performing an L1 regular constraint on the plurality of scaling coefficients.

7. The model generation method according to claim 1, wherein performing, by the first processor, the channel pruning on the first channel to generate the object detection model comprises:
   performing, by the first processor, the channel pruning on the first channel to obtain a pruning detection model; and
   performing, by the first processor, fine-tuning training on the pruning detection model to generate the object detection model.

8. The model generation method according to claim 1, wherein the original detection model comprises a Single Shot MultiBox Detector (SSD).

9. The model generation method according to claim 8, wherein a backbone network of the SSD comprises an inception_v3 structure.

10. An object detection method, performed by an object detection apparatus, wherein the object detection apparatus comprises a second processor, and a second memory configured to store a second program; wherein the second program, when executed by the second processor, causes the second processor to perform the object detection method; the object detection method comprising:

acquiring, by the second processor, the object detection model generated according to the model generation method of claim 1 and a first image; and inputting, by the second processor, the first image into the object detection model, and obtaining, by the second processor, an object detection result of a first object in the first image according to an output result of the object detection model.

11. A model generation apparatus, comprising: a first processor, and a first memory configured to store a first program, wherein the first program, when executed by the first processor, causes the first processor to perform:

acquiring, by the first processor, a plurality of scaling coefficients of a batch normalization layer in an initially-trained intermediate detection model, wherein the intermediate detection model is obtained by training an original detection model based on a plurality of training samples, and each of the plurality of training samples comprises a sample image and a sample annotation result of a known object in the sample image;

screening, by the first processor, a first coefficient from the plurality of scaling coefficients according to values of the plurality of scaling coefficients; and screening, by the first processor, a first channel corresponding to the first coefficient from a plurality of channels of the intermediate detection model, and performing, by the first processor, channel pruning on the first channel to generate an object detection model.

12. An object detection apparatus, comprising: a second processor; and a second memory configured to store a second program, wherein the second program, when executed by the second processer, causes the second processor to perform:

acquiring, by the second processor, the object detection model generated by the model generation apparatus of claim 11 and a first image; and inputting, by the second processor, the first image into the object detection model, and obtaining, by the second processor, an object detection result of a first object in the first image according to an output result of the object detection model.

13. An unmanned vehicle, comprising the object detection apparatus according to claim 12, a driving device and a path planning device, wherein the driving device is configured to drive the unmanned vehicle to run according to a path planned by the path planning device, the object detection apparatus is configured to detect a first object in a first image, and the path planning device is configured to plan a path of the unmanned vehicle according to a detection result of the first object in the first image detected by the object detection apparatus.

14. The model generation apparatus according to claim 11, wherein the first program, when executed by the first processor, causes the first processor to perform; screening, by the first processor, the first coefficient from the plurality of scaling coefficients according to the values of the plurality of scaling coefficients in the following way:

obtaining, by the first processor, a pruning threshold of the plurality of scaling coefficients according to the values of the plurality of scaling coefficients and a preset pruning rate, and screening, by the first processor, the first coefficient from the plurality of scaling coefficients according to the pruning threshold.

15. The model generation apparatus according to claim 11, wherein the first program, when executed by the at least one-first processor, causes the first processor to further perform:

screening, by the first processor, a prunable convolution layer from a plurality of convolution layers of the intermediate detection model, wherein the prunable convolution layer comprises a convolution layer other than at least one of a convolution layer in classification and regression branches or a 1*1 convolution layer; and screening, by the first processor, a scaling coefficient corresponding to the prunable convolution layer from the plurality of scaling coefficients, wherein the scaling coefficient corresponding to the prunable convolution layer is an object scaling coefficient;

wherein screening, by the first processor, the first coefficient from the plurality of scaling coefficients according to the values of the plurality of scaling coefficients comprises: screening, by the first processor, the first coefficient from a plurality of object scaling coefficients according to values of the plurality of object scaling coefficients.

16. The model generation apparatus according to claim 11, wherein a plurality of first coefficients are provided; and wherein the first program, when executed by the first processor, causes the first processor to perform screening, by the first processor, the first channel corresponding to the first coefficient from the plurality of channels of the intermediate detection model in the following way:

screening, by the first processor from a plurality of channels of a plurality of convolution layers of the intermediate detection model, an output channel of a current convolution layer corresponding to a current pruning coefficient among the plurality of first coefficients and an input channel of a next convolution layer of the current convolution layer, and regarding, by the first processor, the output channel and the input channel as the first channel.

17. The model generation apparatus according to claim 11, the first program, when executed by the first processor, causes the first processor to further perform:

acquiring, by the first processor, the plurality of training samples, and performing, by the first processor based on the plurality of training samples, sparse training based on the batch normalization layer on the original detection model to obtain the intermediate detection model.

18. The model generation apparatus according to claim 17, wherein an object loss function in the original detection model is composed of an original loss function and an L1 regular constraint function, and the L1 regular constraint function comprises a loss function performing an L1 regular constraint on the plurality of scaling coefficients.

19. A non-transitory computer-readable storage medium, storing a first program, wherein the first program, when executed by a first processor, implements a model generation method;

wherein the model generation method comprises:

acquiring, by the first processor, a plurality of scaling coefficients of a batch normalization layer in an initially-trained intermediate detection model, wherein the intermediate detection model is obtained by training an original detection model based on a plurality of training samples, and each of the plurality of training samples comprises a sample image and a sample annotation result of a known object in the sample image;

screening, by the first processor, a first coefficient from the plurality of scaling coefficients according to values of the plurality of scaling coefficients; and screening, by the first processor, a first channel corresponding to the first coefficient from a plurality of channels of the intermediate detection model, and performing, by the first processor, channel pruning on the first channel to generate an object detection model.

* * * * *